United States Patent
Miyazaki et al.

(10) Patent No.: US 11,192,174 B2
(45) Date of Patent: Dec. 7, 2021

(54) SIDE SEALING DEVICE, TWIN-ROLL CONTINUOUS CASTING APPARATUS, AND METHOD OF MANUFACTURING CAST STRIP

(71) Applicant: NIPPON STEEL CORPORATION, Tokyo (JP)

(72) Inventors: Masafumi Miyazaki, Tokyo (JP); Takashi Arai, Tokyo (JP); Kazuya Maruyama, Tokyo (JP); Shuji Wakida, Tokyo (JP); Naoki Kamachi, Tokyo (JP); Masanobu Hayama, Kitakyushu (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/759,093

(22) PCT Filed: May 8, 2018

(86) PCT No.: PCT/JP2018/017785
§ 371 (c)(1),
(2) Date: Apr. 24, 2020

(87) PCT Pub. No.: WO2019/092903
PCT Pub. Date: May 16, 2019

(65) Prior Publication Data
US 2020/0338632 A1    Oct. 29, 2020

(30) Foreign Application Priority Data
Nov. 7, 2017    (JP) .............................. JP2017-214782

(51) Int. Cl.
*B22D 11/06*    (2006.01)

(52) U.S. Cl.
CPC ...... *B22D 11/0645* (2013.01); *B22D 11/0622* (2013.01)

(58) Field of Classification Search
CPC .. B22D 11/06; B22D 11/0622; B22D 11/0645
See application file for complete search history.

(56) References Cited

U.S. PATENT DOCUMENTS 5,060,714 A * 10/1991 Yamauchi .......... B22D 11/0651
164/428
5,787,968 A * 8/1998 Lauener ............... B22D 11/066
164/481

(Continued)

FOREIGN PATENT DOCUMENTS

CN    102198495 A    9/2011
JP    57-79013 A    5/1982

(Continued)

OTHER PUBLICATIONS

International Search Report for PCT/JP2018/017785 dated Jul. 3, 2018.

(Continued)

*Primary Examiner* — Kevin E Yoon
(74) *Attorney, Agent, or Firm* — Birch, Stewart, Kolasch & Birch, LLP

(57) ABSTRACT

A side sealing device for a twin-roll continuous casting apparatus, which supplies molten metal to a molten metal pool portion formed by a pair of rotating mold rolls and a pair of side weirs through an immersion nozzle and causes solidified shells to be formed and to grow on peripheral surfaces of the mold rolls to manufacture a cast strip, seals end surface sides of the mold rolls by each side weir. The side sealing device includes a side weir pressing unit that (Continued)

presses the side weir against end surfaces of the mold rolls, and a side weir lifter that pulls the side weir at least upward in a vertical direction.

6 Claims, 10 Drawing Sheets

(56) References Cited

U.S. PATENT DOCUMENTS

| | | | |
|---|---|---|---|
| 6,296,046 | B1 | 10/2001 | Jeong et al. |
| 2004/0020257 | A1 | 2/2004 | Sato et al. |

FOREIGN PATENT DOCUMENTS

| | | | | |
|---|---|---|---|---|
| JP | 59-215255 A | | 12/1984 | |
| JP | 61-39283 A | | 2/1986 | |
| JP | 02034253 A | * | 2/1990 | ........... B22D 11/066 |
| JP | 02046951 A | * | 2/1990 | ........... B22D 11/066 |
| JP | 2-247050 A | | 10/1990 | |
| JP | 4-46656 A | | 2/1992 | |
| JP | 5-161943 A | | 6/1993 | |
| JP | 5-161944 A | | 6/1993 | |
| JP | 5-253647 A | | 10/1993 | |
| JP | 6-15414 A | | 1/1994 | |
| JP | 6-277807 A | | 10/1994 | |
| JP | 2001-205400 A | | 7/2001 | |
| JP | 2002-219559 A | | 8/2002 | |
| JP | 2003-305547 A | | 10/2003 | |
| JP | 2018-79508 A | | 5/2018 | |
| KR | 20120072496 A | * | 7/2012 | |
| WO | WO 02/34479 A1 | | 5/2002 | |

OTHER PUBLICATIONS

Office Action for TW 107115593 dated Dec. 27, 2018.
Written Opinion of the International Searching Authority for PCT/JP2018/017785 (PCT/ISA/237) dated Jul. 3, 2018.

* cited by examiner

--RELATED ART--

SIDE SEALING DEVICE, TWIN-ROLL CONTINUOUS CASTING APPARATUS, AND METHOD OF MANUFACTURING CAST STRIP

TECHNICAL FIELD OF THE INVENTION

The present invention relates to a side sealing device used for a twin-roll continuous casting apparatus that supplies molten metal to a space formed by a pair of mold rolls and a pair of side weirs to form a molten metal pool and manufactures a cast strip, a twin-roll continuous casting apparatus including the side sealing device, and a method of manufacturing a cast strip.

Priority is claimed on Japanese Patent Application No. 2017-214782, filed on Nov. 7, 2017, the content of which is incorporated herein by reference.

RELATED ART

A twin-roll continuous casting apparatus is provided as a method of manufacturing a cast strip made of a metal. The twin-roll continuous casting apparatus includes a pair of mold rolls having water cooling structure therein and rotating in directions opposite to each other, supplies molten metal to a space formed by the pair of rotating mold rolls and a pair of side weirs to form a molten metal pool, causes solidified shells to be formed and to grow on the peripheral surfaces of the mold rolls, and presses the solidified shells formed on the respective outer peripheral surfaces of the pair of mold rolls at a roll nip point to manufacture a cast strip having a predetermined thickness. The twin-roll continuous casting apparatus is applied for various metals.

The above-mentioned twin-roll continuous casting apparatus continuously supplies molten metal to the molten metal pool portion from a tundish disposed above the mold rolls through an immersion nozzle. Molten metal is ejected to the peripheral surfaces of the mold rolls from the immersion nozzle that is disposed at the center portion of the molten metal pool portion and flows toward the pair of side weirs along the peripheral surfaces of the mold rolls. Molten metal is solidified and grows on the peripheral surfaces of the rotating mold rolls to form solidified shells, and the solidified shells formed on the peripheral surfaces of the respective mold rolls are pressed at the roll nip point.

Here, the above-mentioned twin-roll casting apparatus is configured to press the side weirs against both end surfaces of the mold rolls to form the molten metal pool portion. To withstand high temperature and to keep sealing between the side weir and the end surfaces of the mold rolls by being worn, a portion of each side weir abutting the end surfaces of the mold rolls is made of a material, which has good heat resistance and is softer than the mold roll. In a case where a cast strip made of steel is to be manufactured, boron nitride-based refractories are usually used as the above-mentioned portion of each side weir.

Further, in a case where a gap between the end surface of the mold roll and the abutting surface of the side weir exceeds 0.2 mm, molten metal flows into the gap, is solidified, and forms burrs. Accordingly, not only the quality of a cast strip deteriorates but also the burrs scrape the abutting surface of the side weir with the rotation of the mold rolls, and the gap is increased. For this reason, there is a concern that sealing may be fractured and molten metal may leak out. Accordingly, the gap between the end surface of the mold roll and the abutting surface of the side weir needs to be reduced to 0.2 mm or less.

Here, even in a case where a contact state between the end surface of the mold roll and the abutting surface of the side weir is adjusted to room temperature, the side weir reaches a high temperature at the time of casting. For this reason, the side weir is deformed due to thermal expansion and a gap is formed between the end surface of the mold roll and the abutting surface of the side weir.

Further, since the side weir is in contact with the rotating mold rolls, the shift of the position of the side weir occurs as described later due to a friction force between the end surfaces of the mold rolls and the abutting surface of the side weir. For this reason, there is also a concern that the gap may be increased.

Furthermore, in a case where the solidified shells formed on the peripheral surfaces of the mold rolls are bonded to each other near a portion (roll nip point) where the mold rolls are closest to each other and are rolled by the mold rolls, the endmost end portions of the solidified shell slightly protrude from the end surfaces of the mold rolls and cause a force to be generated in a direction where the side weirs are extruded from the mold rolls. Accordingly, a gap between the end surface of the mold roll and the side weir is increased particularly at the lower portion of the side weir. For this reason, there is a concern that sealing may deteriorate.

For example, Patent Documents 1 and 2 propose techniques for strongly pressing a side weir against the end surfaces of mold rolls as a method of suppressing the deterioration of sealing.

Further, Patent Document 3 proposes a technique for pressing a side weir according to the stiffness of the side weir, and Patent Document 4 proposes a technique for clamping and fixing pressing looseness.

Furthermore, Patent Document 5 proposes a technique for precisely controlling the pressing distance of a side weir.

In addition, Patent Document 6 proposes a technique for preventing the peeling of base metal of the refractory of a side weir caused by the meniscus of a molten metal reservoir by raising the side weir according to the damage rate of the side weir and raising the height of the surface of the molten steel in the molten metal reservoir according to the rising speed of the side weir.

PRIOR ART DOCUMENT

Patent Document

[Patent Document 1] Japanese Unexamined Patent Application, First Publication No. H04-046656
[Patent Document 2] Japanese Unexamined Patent Application, First Publication No. H05-161944
[Patent Document 3] Japanese Unexamined Patent Application, First Publication No. H06-277807
[Patent Document 4] Japanese Unexamined Patent Application, First Publication No. H05-253647
[Patent Document 5] Japanese Unexamined Patent Application, First Publication No. H05-161943
[Patent Document 6] Japanese Unexamined Patent Application, First Publication No. 2002-219559

DISCLOSURE OF THE INVENTION

Problems to be Solved by the Invention

Incidentally, in the techniques disclosed in Patent Documents 1 and 2, the rotation of the mold rolls is hindered in a case where the side weir is strongly pressed for sealing, and the side weir is fractured in a case where the side weir is more strongly pressed. For this reason, there is a concern that casting cannot be stably performed.

Further, in the techniques disclosed in Patent Documents 3 and 4, it is not possible to follow a change in a friction force between the mold roll and the side weir in a case where the rotating speed of the mold roll, the state of the end surface of the mold roll, and the like are changed. For this reason, there is a concern that sealing cannot be kept well.

Furthermore, in the technique disclosed in Patent Document 5, the side weir is not configured to be pressed in sufficient consideration of the contact state of the abutting surface of the side weir. For this reason, it is very difficult to stably control the pressing distance of the side weir.

Moreover, in the technique disclosed in Patent Document 6, pressing units pressing side weirs against both end surfaces of cooling drums are raised to raise the side weirs. However, in such a configuration, the shift of the position of the side weir occurs so that the upper portion of the side weir falls forward against the mold rolls. For this reason, it is very difficult to stably control the pressing distance of the side weir.

The invention has been made in consideration of the above-mentioned circumstances, and an object of the invention is to provide a side sealing device for a twin-roll continuous casting apparatus, the twin-roll continuous casting apparatus, and a method of manufacturing a cast strip that can suppress an increase in a gap between the abutting surface of a side weir and the end surface of a mold roll by suppressing the shift of the position of the side weir and can stably cast a cast strip.

Means for Solving the Problem

To achieve the object, there is provided a side sealing device according to an aspect of the invention for a twin-roll continuous casting apparatus that supplies molten metal to a molten metal pool portion formed by a pair of rotating mold rolls and a pair of side weirs through an immersion nozzle and causes solidified shells to be formed and to grow on peripheral surfaces of the mold rolls to manufacture a cast strip. The side sealing device seals end surface sides of the mold rolls by each side weir, and includes a side weir pressing unit that presses the side weir against end surfaces of the mold rolls and a side weir lifter that pulls the side weir at least upward in a vertical direction.

In a case where the side weir is pressed against the end surfaces of the mold rolls, a downward pulling force acts on the abutting surface of the side weir due to a friction force between the end surfaces of the rotating mold rolls and the side weir. Here, the device for holding the side weir and pressing the side weir against the mold rolls is present on the side of the side weir opposite to the abutting surface and the side weir is in the state of a cantilever. Accordingly, in a case where a downward pulling force is applied to the abutting surface, the shift of the position of the side weir occurs so that the side weir is moved downward and the upper portion of the side weir falls forward against the mold rolls. Particularly, since static friction is generated between the end surfaces of the mold rolls and the abutting surface of the side weir at the time of the start of casting and has a large friction coefficient, a downward pulling force is large and the shift of the position of the side weir is likely to occur.

Accordingly, since the side sealing device according to the aspect of the invention includes the side weir lifter that pulls the side weir at least upward in a vertical direction, the downward pull of the side weir is suppressed even though the side weir is pressed against the end surfaces of the mold rolls by the side weir pressing unit. As a result, the shift of the position of the side weir is suppressed. Therefore, since the formation of a large gap between the end surface of the mold roll and the abutting surface of the side weir can be suppressed, a cast strip can be stably manufactured.

Here, in the side sealing device according to the aspect of the invention, it is preferable that the side weir lifter is connected to a region above a centroid of the side weir.

In this case, if the side weir lifter is connected to the side weir so that the side weir is lifted in a reverse rotation direction in consideration of an axis of rotational displacement where the side weir falls forward against the mold rolls, the displacement of the side weir can be further suppressed. Accordingly, the formation of a large gap between the end surface of the mold roll and the abutting surface of the side weir can be suppressed.

Further, in the side sealing device according to the aspect of the invention, the side weir lifter may be configured to be engaged with the side weir or a support member supporting the side weir in a case where the side weir is pressed against the end surfaces of the mold rolls by the side weir pressing unit, and may be configured to pull the side weir at least upward in the vertical direction.

In this case, since the side weir lifter is configured to be engaged with the side weir or the support member supporting the side weir when the side weir is pressed against the end surfaces of the mold rolls, the side weir lifter does not need to be moved together with the side weir at the time of the start of casting.

Furthermore, in the side sealing device according to the aspect of the invention, the side weir lifter may be formed of a cylinder that pulls the side weir at least upward in the vertical direction by pressure of fluid.

In this case, the side weir can be reliably pulled at least upward in the vertical direction by a hydraulic cylinder, a gas cylinder, or the like.

Moreover, in the side sealing device according to the aspect of the invention, the side weir lifter may be configured to pull the side weir at least upward in the vertical direction by a biasing force of a biasing member.

In this case, since the side weir lifter is configured to pull the side weir by a biasing member, such as a spring member, the side weir lifter does not require an electrical system for operation. As a result, the structure of the side weir lifter is simplified. It is possible to set a pulling force by adjusting the biasing force of the biasing member in advance.

There is provided a twin-roll continuous casting apparatus according to another aspect of the invention that supplies molten metal to a molten metal pool portion formed by a pair of rotating mold rolls and a pair of side weirs and causes solidified shells to be formed and to grow on peripheral surfaces of the mold rolls to manufacture a cast strip. The twin-roll continuous casting apparatus includes the above-mentioned side sealing device.

According to the twin-roll continuous casting apparatus having this configuration, since the above-mentioned side sealing device is provided, the formation of a large gap between the end surface of the mold roll and the abutting surface of the side weir can be suppressed. Therefore, a cast strip can be stably manufactured.

There is provided a method of manufacturing a cast strip according to still another aspect of the invention that supplies molten metal to a molten metal pool portion formed by a pair of rotating mold rolls and a pair of side weirs and causes solidified shells to be formed and to grow on peripheral surfaces of the mold rolls to manufacture a cast strip. The method includes pressing the side weir against end surfaces of the mold rolls using the above-mentioned side sealing device, and pulling the side weir at least upward in a vertical direction.

According to the twin-roll continuous casting apparatus having this configuration, since the side weir is pressed against the end surfaces of the mold rolls using the above-mentioned side sealing device and the side weir is pulled at least upward in the vertical direction, the shift of the position of the side weir can be suppressed. Accordingly, since the formation of a large gap between the end surface of the mold roll and the abutting surface of the side weir can be suppressed, a cast strip can be stably manufactured.

Effects of the Invention

According to the invention, it is possible to provide a side sealing device for a twin-roll continuous casting apparatus, the twin-roll continuous casting apparatus, and a method of manufacturing a cast strip that can suppress an increase in a gap between the abutting surface of a side weir and the end surface of a mold roll by suppressing the shift of the position of the side weir and can stably cast a cast strip as described above.

EMBODIMENTS OF THE INVENTION

Embodiments of the invention will be described below with reference to the accompanying drawings. In the following embodiments, steel will be described as metal used for casting. The invention is not limited to the following embodiments.

Here, examples of steel forming a cast strip 1 to be manufactured in this embodiment include ultra-low carbon steel of which carbon content is in the range of 0.001 to 0.01%, low carbon steel of which carbon content is in the range of 0.02 to 0.05%, medium carbon steel of which carbon content is in the range of 0.06 to 0.4%, high carbon steel of which carbon content is in the range of 0.5 to 1.2%, austenitic stainless steel that is typified by SUS304 steel, ferritic stainless steel that is typified by SUS430 steel, oriented magnetic steel of which Si content is in the range of 3.0 to 3.5%, non-oriented magnetic steel of which Si content is in the range of 0.1 to 6.5%, and the like (% means % by mass).

Further, in this embodiment, the width of the cast strip 1 to be manufactured is in the range of 500 mm to 2000 mm and the thickness of the cast strip 1 is in the range of 1 mm to 5 mm.

A twin-roll continuous casting apparatus 10 used in a method of manufacturing a cast strip according to this embodiment will be described with reference to FIGS. 1 to 4.

Figure 1:
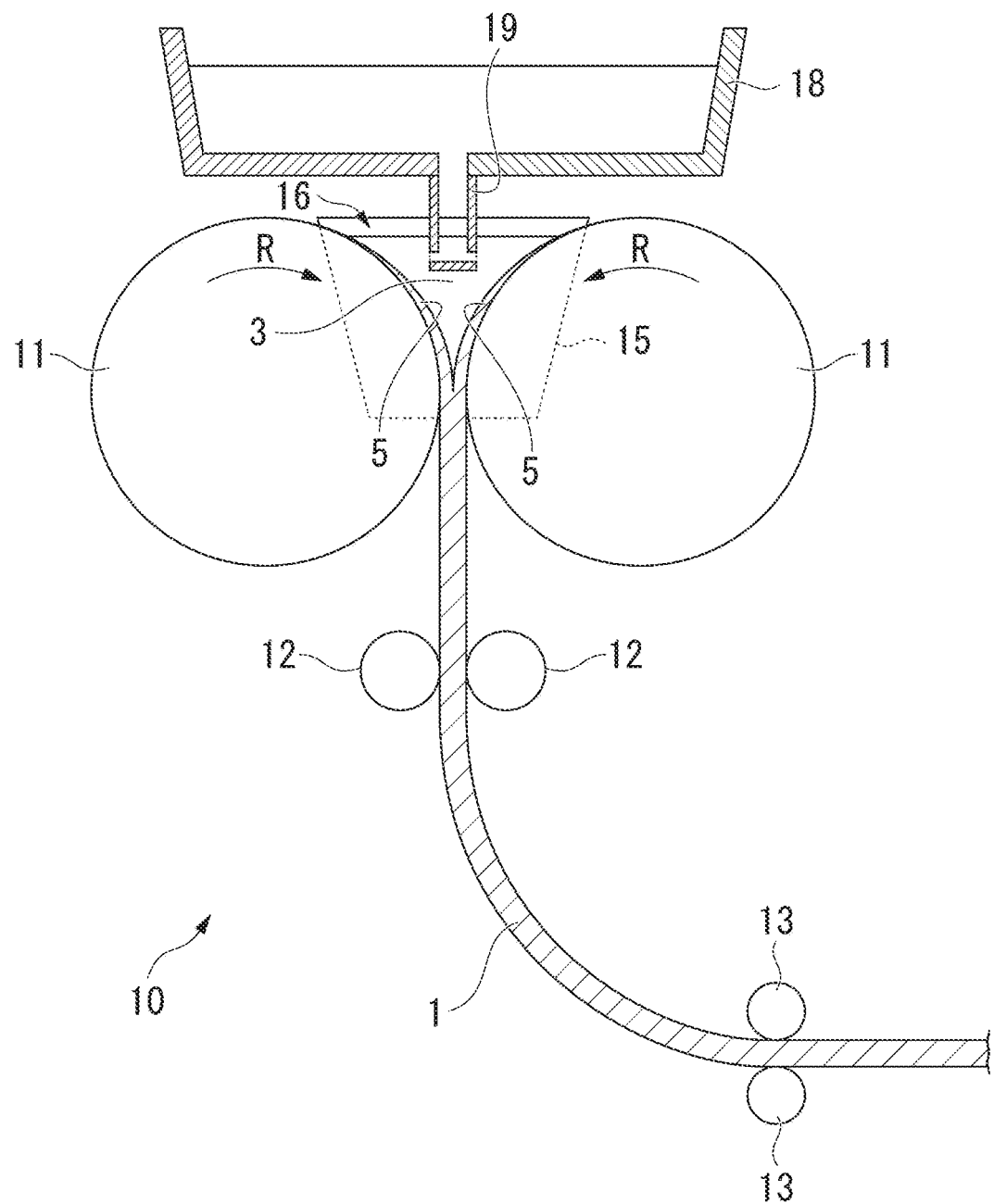
FIG. 1 is a diagram showing an example of a twin-roll continuous casting apparatus used in a method of manufacturing a cast strip according to an embodiment of the invention.

The twin-roll continuous casting apparatus 10 shown in FIG. 1 includes a pair of mold rolls 11 and 11, a pair of pinch rolls 12 and 12 that supports the cast strip 1, a pair of pinch rolls 13 and 13 that is disposed on the downstream side of the pair of pinch rolls 12 and 12 and supports the cast strip 1, side weirs 15 that are provided at end portions of the pair of mold rolls 11 and 11 in a width direction, a tundish 18 that holds molten steel 3 to be supplied to a molten steel pool portion 16 defined by the pair of mold rolls 11 and 11 and the side weirs 15, and an immersion nozzle 19 that supplies the molten steel 3 to the molten steel pool portion 16 from the tundish 18.

In the twin-roll continuous casting apparatus 10, solidified shells 5 and 5 grow on the peripheral surfaces of the mold rolls 11 and 11 since the molten steel 3 is in contact with the rotating mold rolls 11 and 11 and is cooled, and the cast strip 1 having a predetermined thickness is casted since the solidified shells 5 and 5 formed on the pair of the mold rolls 11 and 11 are pressed against each other at a roll nip point.

Figure 2:
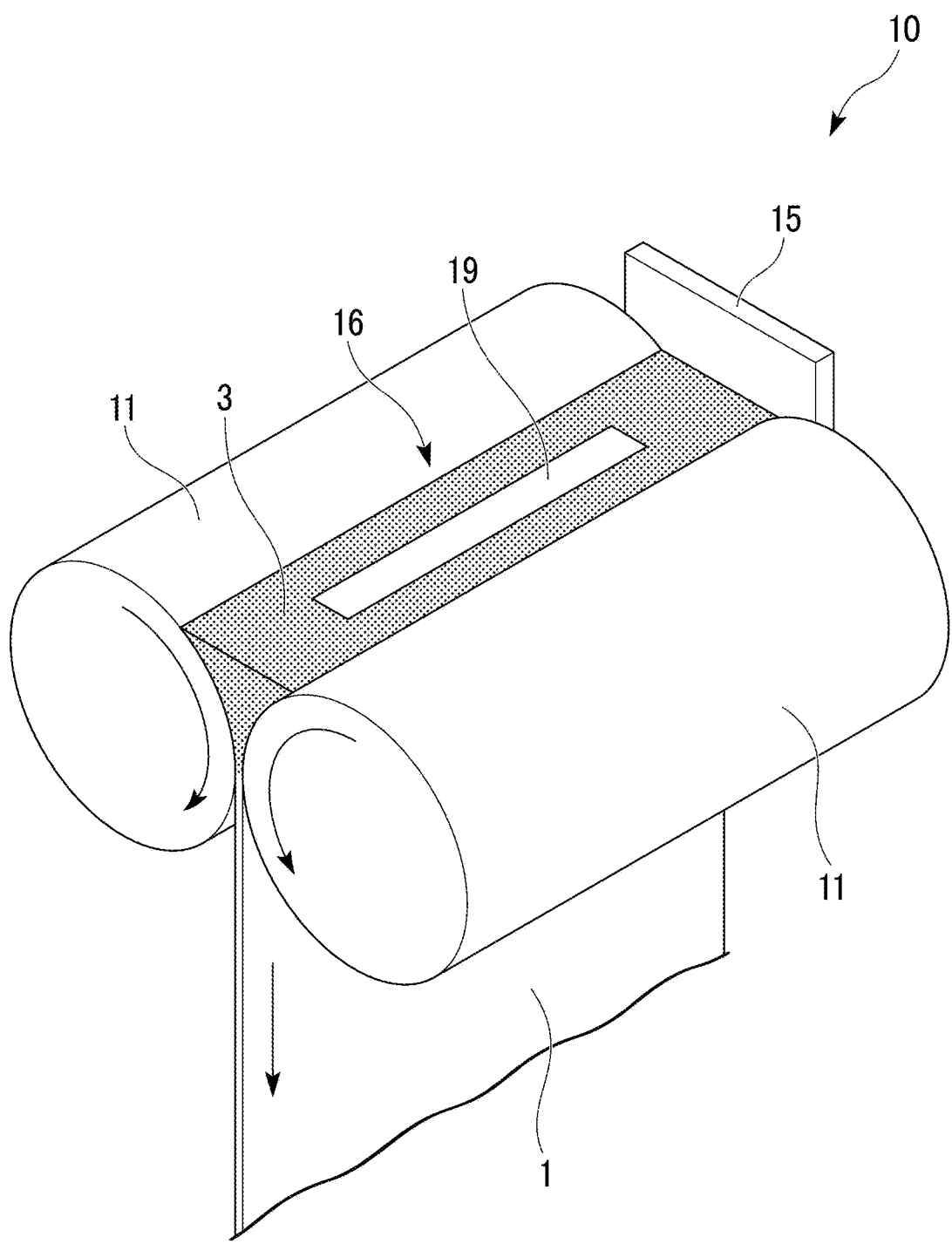
FIG. 2 is an enlarged view of a part of the twin-roll continuous casting apparatus shown in FIG. 1.

Here, since the side weirs 15 are provided on the end surfaces of the mold rolls 11 as shown in FIG. 2, the molten steel pool portion 16 is defined.

As shown in FIG. 2, the surface of the molten steel in the molten steel pool portion 16 has a rectangular shape of which four sides are surrounded by the peripheral surfaces of the pair of mold rolls 11 and 11 and the pair of side weirs 15 and 15, and the immersion nozzle 19 is provided at the center portion of the rectangular surface of the molten steel.

Each side weir 15 has the action of a seal that is in sliding contact with the end surfaces of the mold rolls 11 as described above to prevent the leakage of the molten steel 3 from the end portions of the mold rolls 11.

It is important that the side weirs 15 stably hold the molten steel 3 and do not adversely affect the formation of the solidified shells 5 on the peripheral surfaces of the mold rolls 11. For this reason, a heat resistant material less reactive with the molten steel 3 is used as the material of the side weir 15. For example, graphite, boron nitride, aluminum nitride, silicon nitride, alumina, silica, and the like or composite materials thereof are used as the material of the side weir 15. The side weir 15 made of boron nitride is used in this embodiment.

Figure 3:
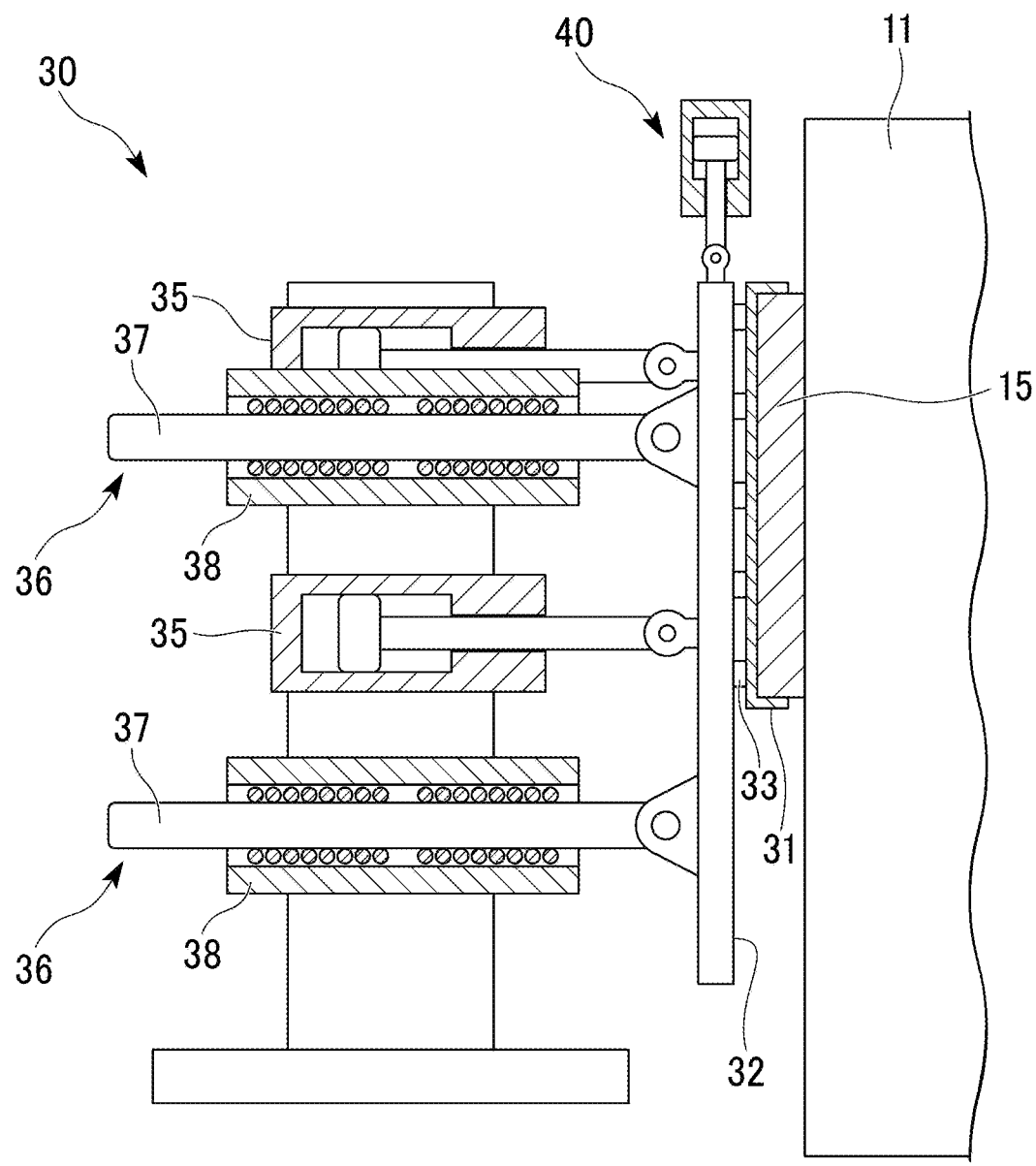
FIG. 3 is a diagram showing the cross section of a side sealing device according to the embodiment of the invention.

Further, as shown in FIG. 3, each side weir 15 is abuts the end surfaces of the mold rolls 11 by a side sealing device 30.

The side sealing device 30 includes a side weir holder 31 that holds the side weir 15, a back plate 32 that is connected to the back side of the side weir holder 31, side weir pressing units 35 that press the side weir 15 against the end surfaces of the mold rolls 11, slide guides 36 that guide the operation of the back plate 32, and a side weir lifter 40 that pulls the side weir 15 at least upward.

Figure 4:
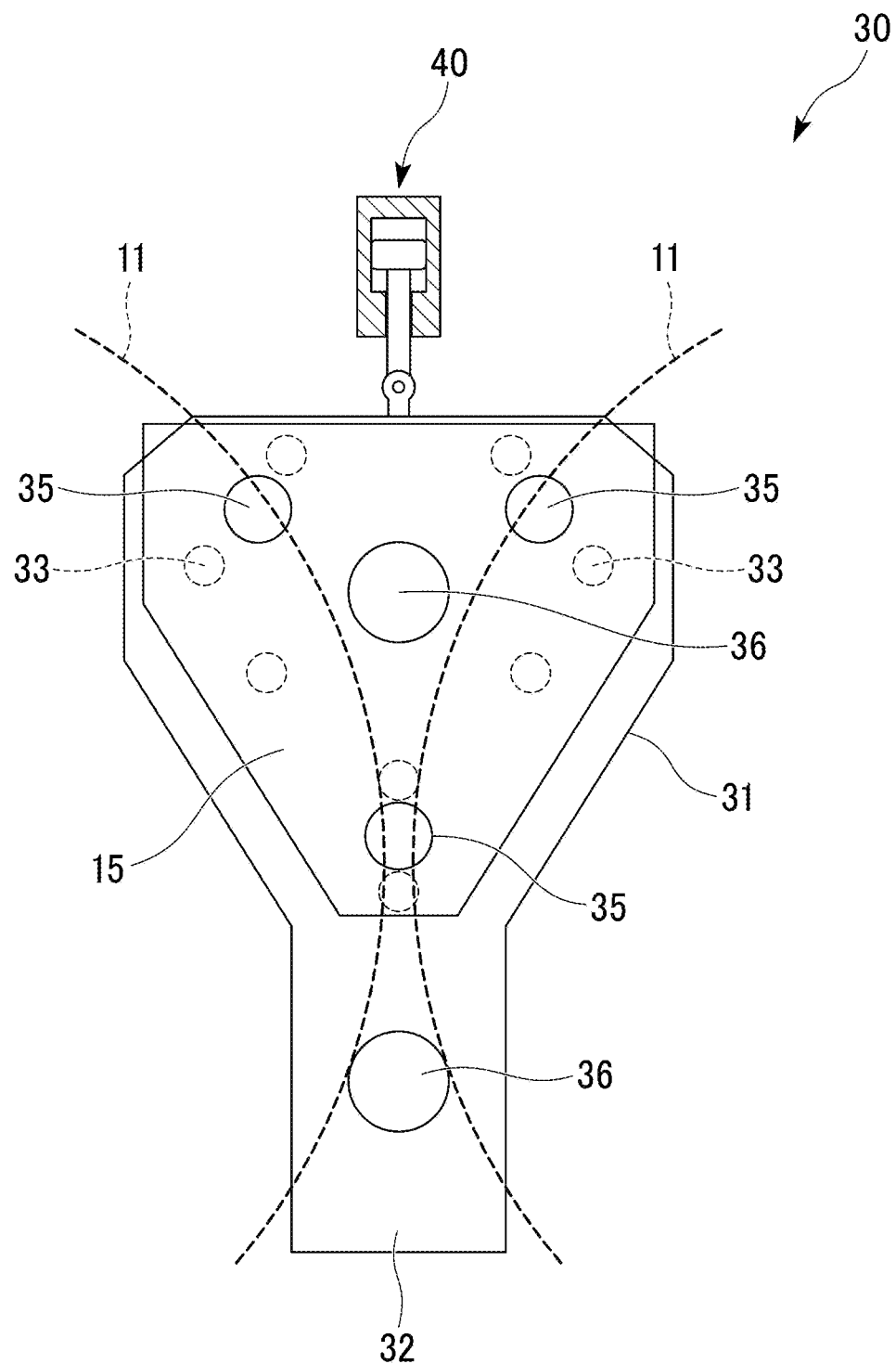
FIG. 4 is a diagram showing the side sealing device according to the embodiment of the invention as seen from a side weir.

Here, the side weir holder 31 and the back plate 32 are fastened to each other by a plurality of coupling members 33 as shown in FIG. 4.

For example, an existing pressing unit, such as a hydraulic cylinder, can be used as the above-mentioned side weir pressing unit 35. In this embodiment, a hydraulic cylinder is used as the side weir pressing unit 35 as shown in FIG. 3. One side weir pressing unit 35 may be provided or a plurality of weir pressing units 35 may be provided.

In this embodiment, as shown in FIG. 4, two side weir pressing units are provided in the upper region of the side weir 15 and the side weir holder 31 and one side weir pressing unit is provided in the lower region thereof, that is, a total of three side weir pressing units are provided. The side weir pressing unit 35 provided in the lower region is positioned near the roll nip point.

In addition, each of the above-mentioned slide guides 36 includes a guide bar 37 and a support cylinder part 38 into which the guide bar 37 is inserted as shown in FIG. 3 and is configured so that the guide bar 37 is supported by balls housed in the support cylinder part 38.

Here, two slide guides 36 are provided at the upper and lower portions of the back plate 32 as shown in FIG. 4.

For example, a hydraulic cylinder and the like can be used as the above-mentioned side weir lifter 40. In this embodiment, a hydraulic cylinder is used as the side weir lifter 40 as shown in FIG. 3. One side weir lifter 40 may be provided or a plurality of side weir lifters 40 may be provided.

In this embodiment, as shown in FIGS. 3 and 4, one side weir lifter 40 is connected to the upper end surface of the back plate 32 and is disposed to pull the back plate 32 and the side weir 15 upward in a vertical direction. That is, the side weir lifter 40 is connected to a region of the side weir 15 above the centroid of the side weir 15 in this embodiment.

Next, a method of manufacturing of the cast strip 1 according to this embodiment using the above-mentioned twin-roll continuous casting apparatus 10 will be described.

Molten steel 3 is supplied to the molten steel pool portion 16, which is formed by the pair of mold rolls 11 and 11 and the side weirs 15, from the tundish 18 through the immersion nozzle 19, and the pair of mold rolls 11 and 11 is rotated in a rotation direction R, that is, the mold rolls 11 and 11 are rotated so that the direction of the molten steel 3 in a region where the pair of mold rolls 11 and 11 is close to each other corresponds to the drawing direction of the cast strip 1 (a downward direction in FIG. 1).

Further, the solidified shells 5 grow on the peripheral surfaces of the mold rolls 11 and the solidified shells 5 and 5 formed on the pair of mold rolls 11 and 11 are pressed against each other at the roll nip point, so that the cast strip 1 having a predetermined thickness is casted.

In this rolling state, the side weirs 15 are pressed against the end surfaces of the mold rolls 11 by the side weir pressing units 35 of the above-mentioned side sealing devices 30 and the end surfaces of the mold rolls 11 are in sliding contact with the abutting surfaces of the side weirs 15, so that the molten steel pool portion 16 is sealed.

In this case, a pressing force FP for the side weir 15 is usually in the range of 500 kgf to 2000 kgf (4903 N to 19613 N).

Further, in this rolling state, the side weir 15 is pulled upward in the vertical direction by the side weir lifter 40 of the above-mentioned side sealing device 30. Accordingly, the downward displacement of the side weir 15 caused by the rotation of the mold rolls 11 is suppressed.

Here, a friction coefficient $\mu$ between the end surface of the mold roll 11 and the abutting surface of the side weir 15 depends on the wear state of the side weir 15, the shape of the end surface of the mold roll 11, and the like and is usually in the range of 0.2 to 0.7.

For this reason, a downward force (pull-down force) FD acting on the side weir 15 due to the rotation of the mold rolls 11 is represented by "FD=$\mu$×FP". Here, the pull-down force FD is applied to the coupling members 33, the slide guides 36, the side weir pressing units 35, and the like and the side weir 15 is displaced downward due to mechanical looseness, so that the shift of the position of the side weir 15 occurs.

Here, a pulling force FU applied upward in the vertical direction is set in the range of 10 kgf to 1500 kgf (98 N to 14709 N) in this embodiment to suppress the shift of the position of the side weir 15 by the above-mentioned side weir lifter 40.

Since disturbance, such as thermal expansion, has an influence during casting, it is preferable that a required pulling force FU is experimentally obtained in advance.

According to the twin-roll continuous casting apparatus 10 and the side sealing device 30 of this embodiment having the above-mentioned configuration, the side weir lifter 40 for pulling the side weir 15 upward in the vertical direction is provided. Accordingly, since the downward pull of the side weir 15 is suppressed even though the side weir 15 is pressed against the end surfaces of the mold rolls 11 by the side weir pressing units 35, the shift of the position of the side weir 15 is suppressed. Therefore, since the formation of a large gap between the end surface of the mold roll 11 and the abutting surface of the side weir 15 can be suppressed, the cast strip 1 can be stably manufactured.

Particularly, since the abutting surface of the side weir 15 is not flat due to thermal expansion at the time of the start of casting, a friction coefficient between the end surface of the mold roll 11 and the abutting surface of the side weir 15 is increased and the shift of the position of the side weir 15 is likely to occur. However, since the side weir lifter 40 is provided in this embodiment as described above, the shift of the position of the side weir 15 at the time of the start of casting can be suppressed. As a result, casting can be stably started.

Further, in this embodiment, the side weir lifter 40 is connected to a region of the side weir 15 above the centroid of the side weir 15 and, specifically, the side weir lifter 40 is connected to the upper end surface of the back plate 32. Accordingly, in a case where the back plate 32 and the side weir 15 are pulled upward in the vertical direction by the side weir lifter 40, the inclination of the side weir 15 can be suppressed. As a result, the formation of a large gap between the end surface of the mold roll 11 and the abutting surface of the side weir 15 in the lower region of the side weir 15 can be suppressed.

In addition, since the pulling force FU applied upward in the vertical direction by the above-mentioned side weir lifter 40 is set in the range of 10 kgf to 1500 kgf (98 N to 14709 N) in this embodiment, the downward pull of the side weir 15 is suppressed. As a result, the shift of the position of the side weir 15 can be accurately suppressed. Accordingly, casting can be stably started.

Further, since two side weir pressing units 35 are provided in the upper region of the side weir 15 and the side weir holder 31 and one side weir pressing unit 35 is provided in the lower region thereof, that is, a total of three side weir pressing units 35 are provided and the side weir pressing unit 35 provided in the lower region is positioned near the roll nip point as shown in FIG. 4 in this embodiment, the side weir 15 can be sufficiently pressed against the end surfaces of the mold rolls 11. Accordingly, the molten steel pool portion 16 can be sufficiently sealed.

The side sealing device, the twin-roll continuous casting apparatus, and the method of manufacturing a cast strip according to the embodiment of the invention have been specifically described above. However, the invention is not limited thereto and can be appropriately modified without departing from the technical scope of the invention.

For example, the twin-roll continuous casting apparatus provided with the pinch rolls as shown in FIG. 1 has been described in this embodiment by way of example, but the arrangement of these rolls and the like is not limited and a design may be appropriately changed.

Further, the side sealing device including three side weir pressing units has been described in this embodiment, but the invention is not limited thereto. The configuration, the number, and the arrangement of the side weir pressing units are not limited.

Furthermore, the side sealing device including two slide guides has been described in the embodiment, but the invention is not limited thereto. The configuration, the number, and the arrangement of the slide guides are not limited.

Further, one side weir lifter 40, which is connected to the upper end surface of the back plate 32 and is configured to pull the back plate upward in the vertical direction as shown in FIGS. 3 and 4, has been described in this embodiment, but the invention is not limited thereto. As long as there is a component pulling the back plate at least upward in the vertical direction, a direction where the side weir is pulled by the side weir lifter is not limited.

Figure 5:
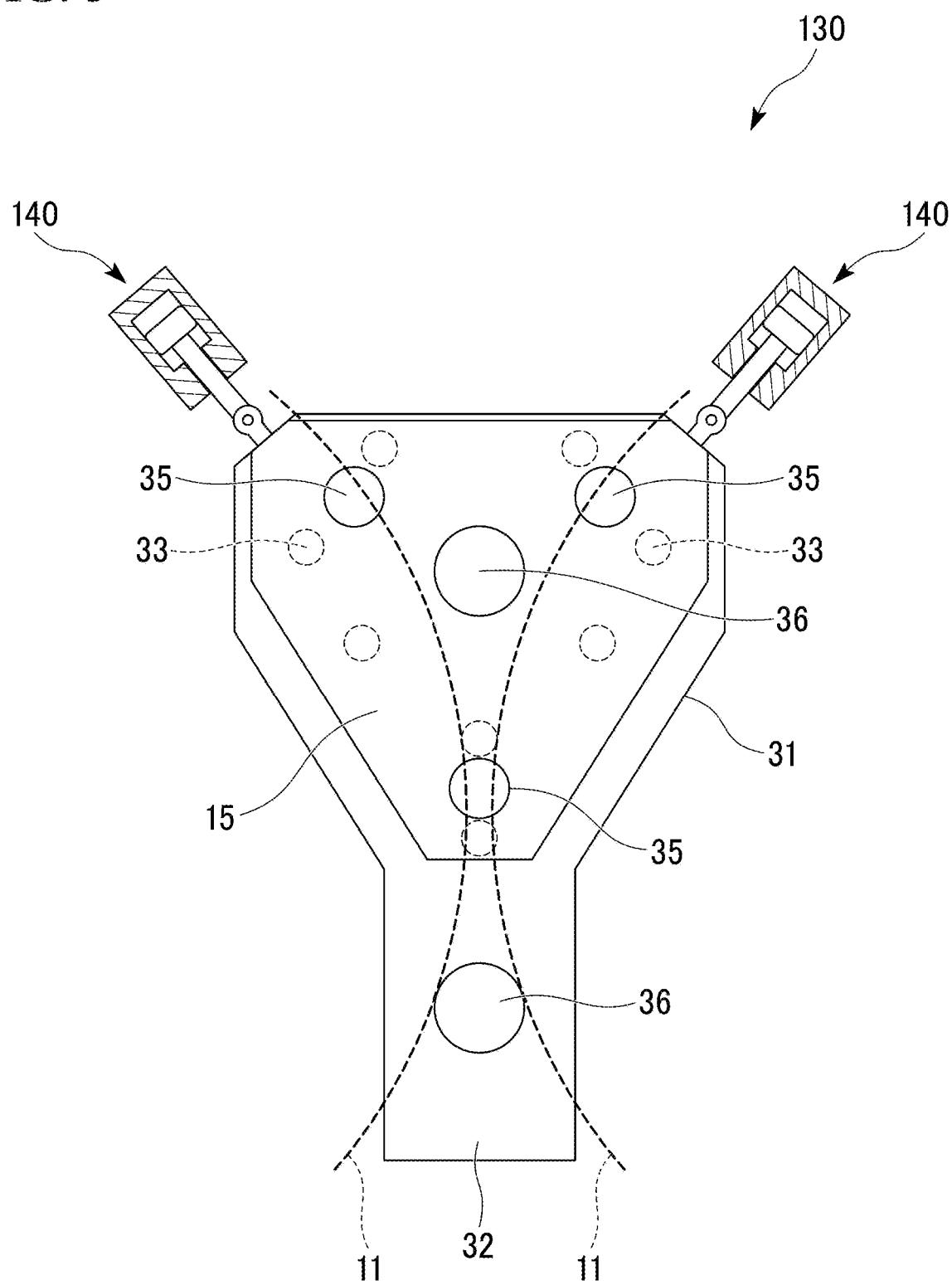
FIG. 5 is a diagram showing a side sealing device according to another embodiment of the invention.

For example, as in a side sealing device 130 shown in FIG. 5, the back plate 32 may be configured to be pulled by two side weir lifters 140 that are connected to both ends of the upper end surface of the back plate 32 in a width direction.

Figure 6:
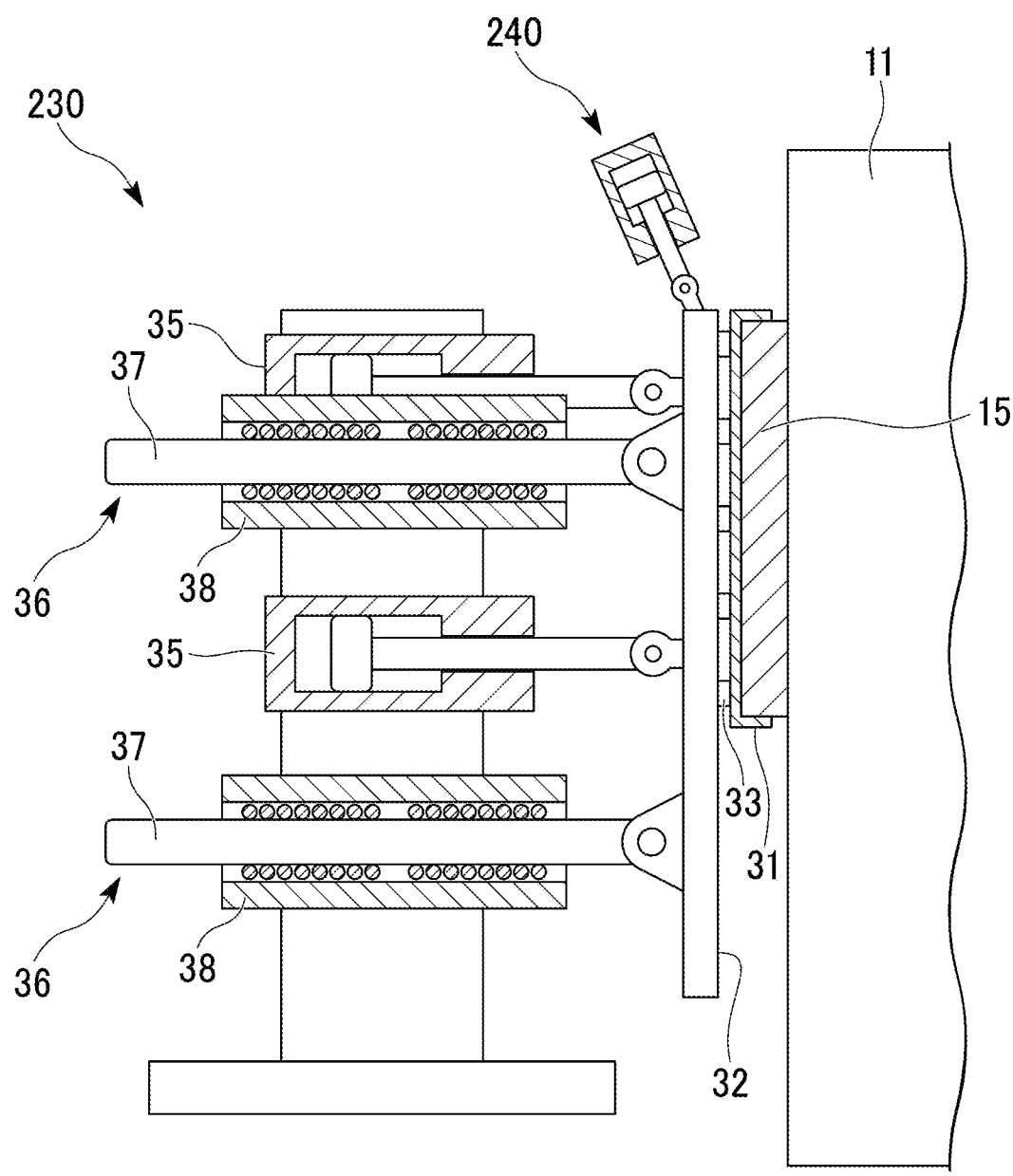
FIG. 6 is a diagram showing a side sealing device according to another embodiment of the invention.

Further, as in a side sealing device 230 shown in FIG. 6, the back plate 32 may be configured to be pulled obliquely upward in a direction where the back plate 32 is separated from the end surfaces of the mold rolls 11 by a side weir lifter 240 connected to the upper end surface of the back plate 32. In this case, since the lower end portion of the side weir 15 is pressed against the end surfaces of the mold rolls 11 as the back plate 32 is pulled by the side weir lifter 240, the formation of a gap between the side weir 15 and the mold roll 11 can be suppressed.

In a case where the back plate 32 is configured to be pulled obliquely upward in a direction where the back plate 32 is separated from the end surfaces of the mold rolls 11 by the side weir lifter 240, a horizontal component of the pulling force of the side weir lifter 240 acts in a direction where the upper portion of the side weir 15 is separated from the mold rolls 11. Accordingly, to reliably press the upper portion of the side weir 15 against the end surfaces of the mold roll 11, it is preferable that the pressing forces of the side weir pressing units 35 disposed in the upper region of the side weir 15 are set in consideration of the horizontal component of the pulling force of the side weir lifter 240.

Figure 7:
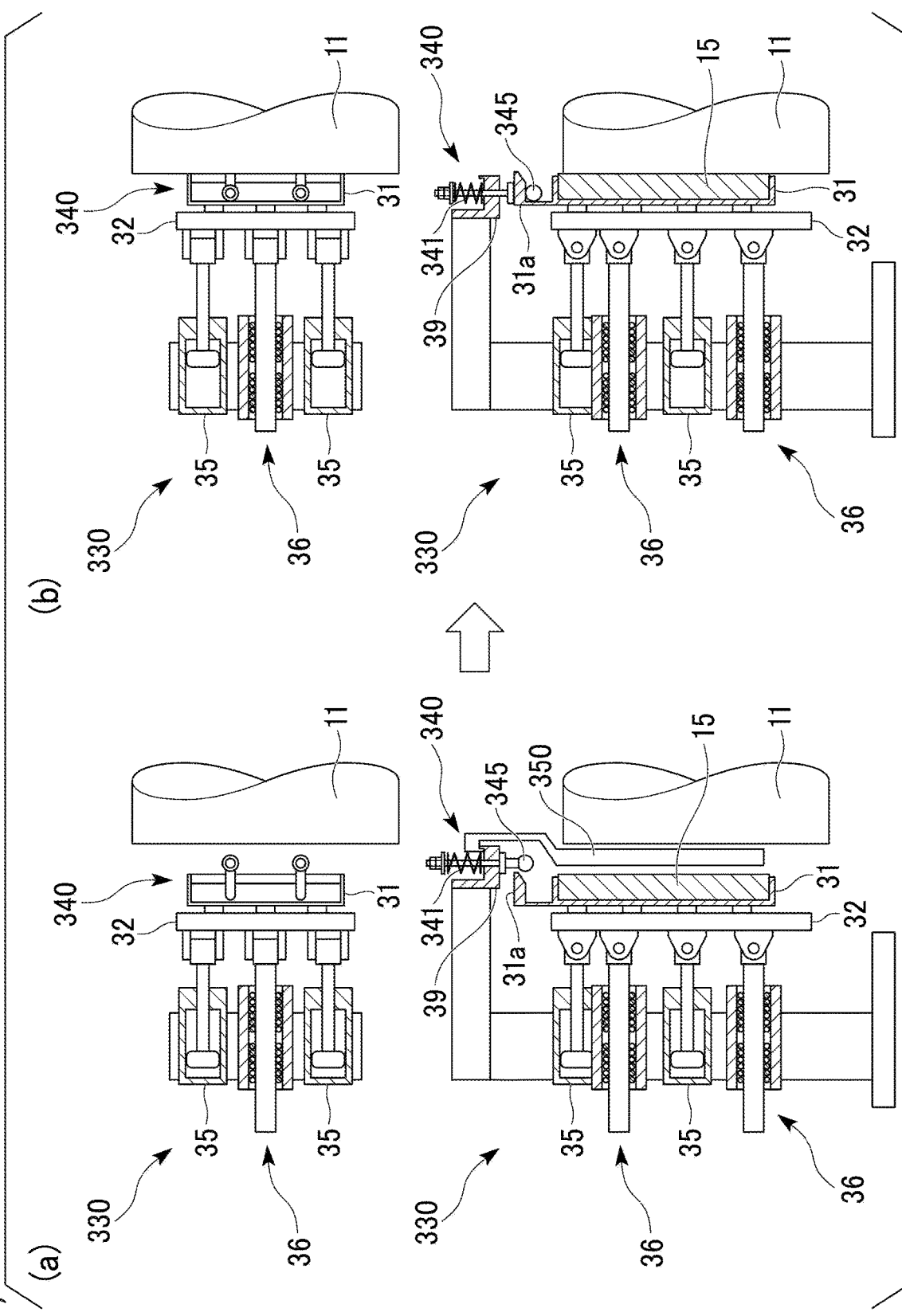
FIG. 7 is a diagram showing a side sealing device according to another embodiment of the invention.

Moreover, the side weir lifter 40 connected to the upper end of the back plate 32 supporting the side weir 15 has been described in this embodiment, but the invention is not limited thereto. As in a side sealing device 330 shown in FIG. 7, side weir lifters 340 may be provided independently of support members (the back plate 32 and the side weir holder 31) supporting the side weir 15, and the support members (the back plate 32 and the side weir holder 31) supporting the side weir 15 and the side weir lifters 340 may be configured to be engaged with each other in a case where the side weir 15 is pressed against the end surfaces of the mold rolls 11 by the side weir pressing units 35. Views shown on the upper sides in FIG. 7 are top views, and views shown on the lower sides are side views. In the side sealing device 330 of FIG. 7, as shown in the top views, two side weir lifters 340 are provided in the width direction of the side weir 15.

Before the start of casting, the side weir 15 is preheated by preheating device 350 in a state where the side weir 15 is separated from the mold rolls 11 as shown in FIG. 7(*a*). In this state, the side weir lifters 340 are not engaged with the support members (the back plate 32 and the side weir holder 31) supporting the side weir 15.

Then, at the time of the start of casting, the side weir lifters 340 are engaged with the support members (the back plate 32 and the side weir holder 31) supporting the side weir 15 as shown in FIG. 7(*b*) in a case where the side weir 15 is pressed against the end surfaces of the mold rolls 11, and the side weir 15 is pulled upward in the vertical direction.

Figure 8:
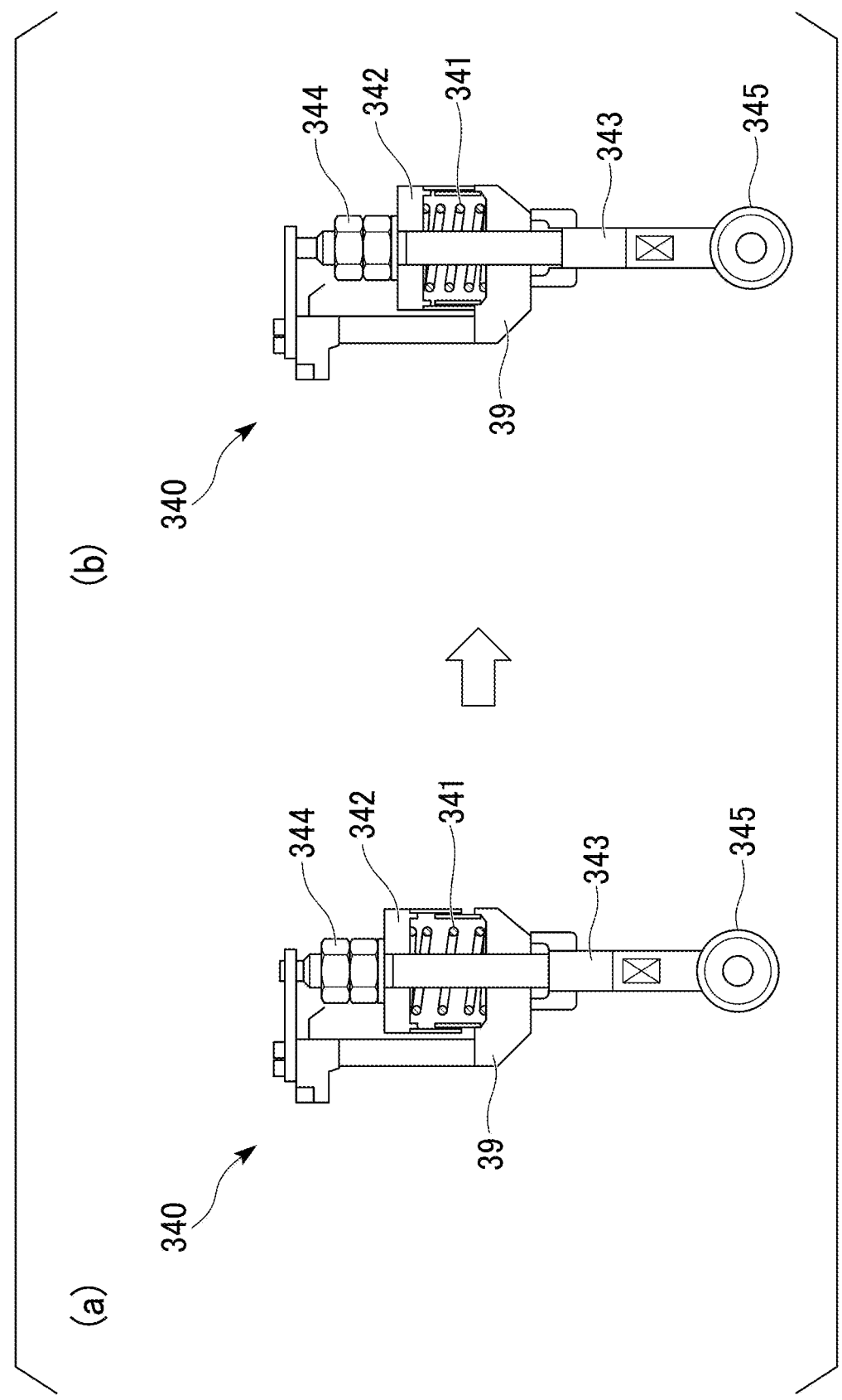
FIG. 8 is a diagram showing a side weir lifter of the side sealing device shown in FIG. 7.

In the side sealing device 330 shown in FIG. 7, each of the side weir lifters 340 includes a spring member 341 that is fixed to a frame 39 positioned above the side weir holder 31 and is disposed on the frame 39 as shown in FIG. 8, a pressing member 342 that is provided above the spring members 341, a rod 343 that is inserted into the spring member 341 and the pressing member 342 and protrudes downward from the frame 39, and adjusting nuts 344 that are threadedly engaged with the upper end portion of the rod 343 and adjust the biasing force of the spring member 341 by pressing the pressing member 342 downward. Further, an engagement roller 345 is provided at the lower end of each rod 343.

As shown in FIG. 7, an engagement claw portion 31*a* to be engaged with the engagement rollers 345 of the side weir lifters 340 is provided at the upper end portion of the side weir holder 31. The tip end portion (an end portion facing the mold roll) of the engagement claw portion 31*a* is formed of an inclined surface that retreats toward a base end side as going downward. Furthermore, in a case where the side weir 15 is pressed against the end surfaces of the mold rolls 11, the engagement claw portion 31*a* is engaged with the engagement rollers 345 provided at the lower ends of the rods 343.

Here, in a state where the side weir 15 is separated from the mold rolls 11, the height of the upper end of the engagement roller 345 is set to a position that is lower than the upper surface of the engagement claw portion 31*a* and is higher than the lower surface of the engagement claw portion 31*a*. For this reason, in a case where the side weir 15 is pressed against the end surfaces of the mold rolls 11, the engagement rollers 345 and the rods 343 are displaced downward along the inclined surface of the tip end portion of the engagement claw portion 31*a*. Accordingly, the spring members 341 are compressed, so that the side weir holder 31 is pulled upward in the vertical direction by the restoring forces (biasing forces) of the spring members 341.

In the side sealing device 330 having this configuration, the side weir lifters 340 are configured to be engaged with the support members (the back plate 32 and the side weir holder 31) supporting the side weir 15 in a case where the side weir 15 is pressed against the end surfaces of the mold rolls 11. Accordingly, at the time of the start of casting, side weir lifters 340 do not need to be moved together with the support members (the back plate 32 and the side weir holder 31) for the side weir 15.

Further, since each side weir lifter 340 includes the spring member 341, each side weir lifter 340 does not require an electrical system for operation. As a result, the structure of the side weir lifter 340 is simplified.

EXAMPLES

The results of performed experiments will be described to check the effects of the invention.

Example 1

Figure 9:
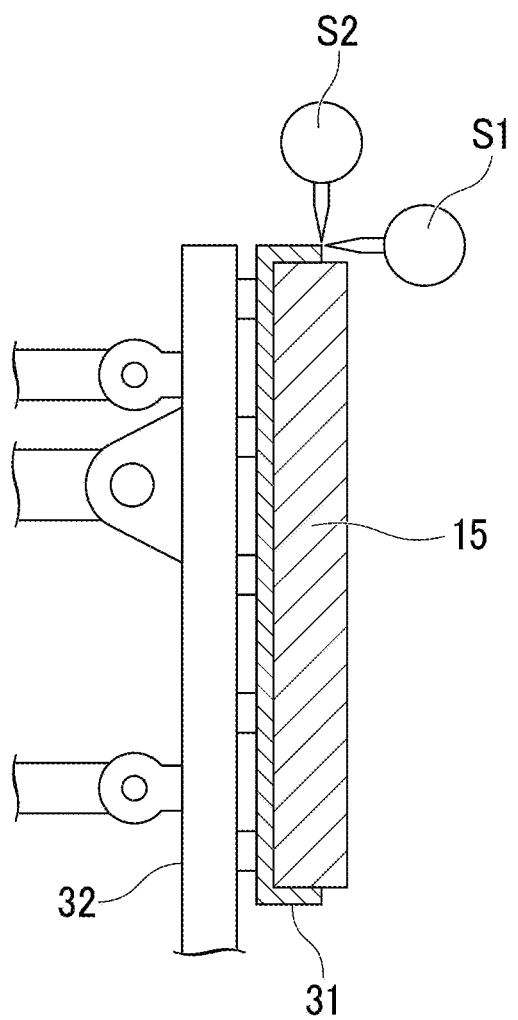
FIG. 9 is a diagram showing points where the amount of displacement of a side weir in a vertical direction and the amount of displacement of the side weir in a horizontal direction are measured in Example.

First, displacement gauges S1 and S2 were installed at positions shown in FIG. 9 where the amount of displacement of a side weir 15 was measured using the twin-roll continuous casting apparatus 10 and the side sealing device 30 described in this embodiment in a state where molten steel was not used; and the displacement of the upper end portion of the side weir holder 31, which held the side weir 15, in a horizontal direction (pressing direction) and the displacement thereof in a vertical direction were measured.

In a state where the side weir 15 made of boron nitride was heated to 1250° C., the side weir 15 was pressed against the end surfaces of mold rolls 11 formed of Cu sleeves plated with Ni and having a diameter of 1000 mm and a width of 1000 mm with each of the pressing forces of two side weir pressing units 35 provided in the upper region which were set to 100 kgf and the pressing force of one side weir pressing unit 35 provided in the lower region which was set to 400 kgf, that is, the side weir 15 was pressed against the end surfaces of the mold rolls 11 with a pressing force of 600 kgf in total and the mold rolls 11 were rotated at a speed of 20 mpm.

Here, as Example 1 of the invention, the side weir 15 was lifted vertically upward with a thrust of 100 kgf by the side weir lifter 40. As Comparative Example 1, the side weir 15 was not lifted by the side weir lifter 40.

Then, the amount of displacement of the side weir in the horizontal direction and the amount of displacement of the side weir in the vertical direction were measured when 30 seconds has passed after the start of sliding. The results of evaluation are shown in Table 1.

TABLE 1

|  | Amount of displacement of side weir in horizontal direction (mm) | Amount of displacement of side weir in vertical direction (mm) |
| --- | --- | --- |
| Example 1 of invention | 0.2 | 0.0 |
| Comparative Example 1 | 2.4 | 3.9 |

In Comparative Example 1, the amount of displacement of the side weir 15 in the horizontal direction was 2.4 mm and the amount of displacement of the side weir 15 in the vertical direction was 3.9 mm.

Figure 10:
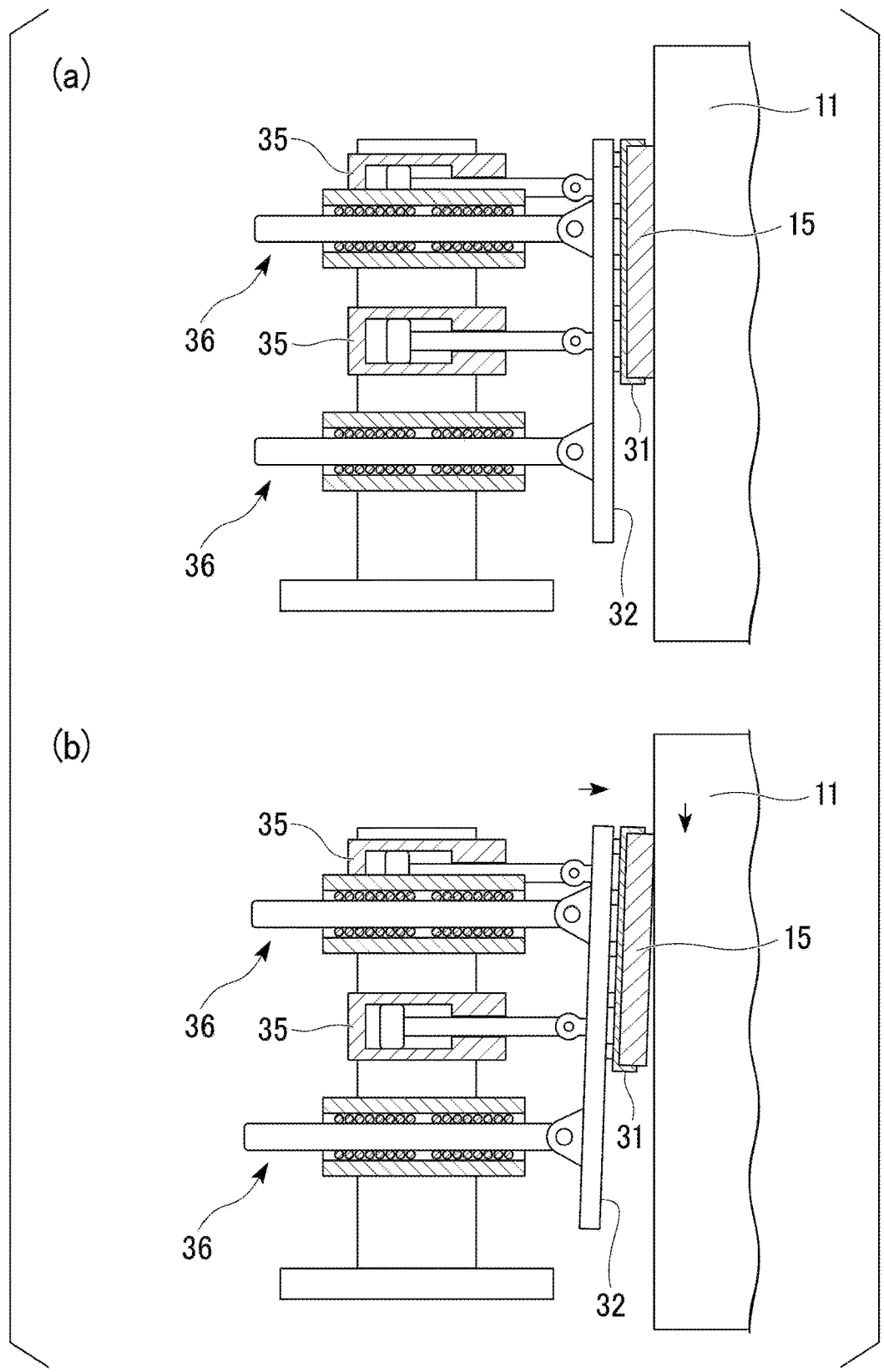
FIG. 10 is a diagram showing a state where the position of a side weir of a side sealing device in the related art is shifted.

In Comparative Example 1, a gap between the side weir 15 and the end surface of the mold roll 11 is not formed as shown in FIG. 10(*a*) in a state where the side weir 15 is abutted. Then, after time when the side weir slides on the mold rolls 11 passed, the side weir 15 is displaced downward and is displaced so that the upper end of the side weir 15 falls against the end surfaces of the mold rolls 11. Accordingly, as shown in FIG. 10(*b*), a gap was formed between the end surface of the mold roll 11 and the abutting surface of the side weir 15 at the lower end of the side weir 15.

In contrast, in Example 1 of the invention where the side weir 15 was pulled vertically upward by the side weir lifter 40, the amount of displacement of the side weir 15 in the horizontal direction was 0.2 mm and the amount of displacement of the side weir 15 in the vertical direction was 0.0 mm. It was confirmed that the shift of the position of the side weir 15 was sufficiently suppressed.

Example 2

Next, a cast strip 1 made of steel was manufactured using the twin-roll continuous casting apparatus 10 and the side sealing devices 30 and 330 described in this embodiment. The composition of this cast strip contained 0.05% by mass of C, 0.6% by mass of Si, 1.5% by mass of Mn, 0.03% by mass of Al, balance Fe, and impurities.

The cast strip 1 having a thickness of 2.0 mm was casted at a casting speed of 50 mpm by mold rolls 11 formed of Cu sleeves plated with Ni and having a diameter of 1000 mm and a width of 1000 mm.

In a state where the side weir 15 made of boron nitride was heated to 1250° C., the side weir 15 was pressed against the end surfaces of the mold rolls 11 formed of Cu sleeves plated with Ni and having a diameter of 1000 mm and a width of 1000 mm with each of the pressing forces of two side weir pressing units 35 provided in the upper region which were set to 100 kgf and the pressing force of one side weir pressing unit 35 provided in the lower region which was set to 400 kgf, that is, the side weir 15 was pressed against the end surfaces of the mold rolls 11 with a pressing force of 600 kgf in total.

Here, as Example 2 of the invention, the side weir 15 was lifted vertically upward by the side weir lifter 40 with a change in a thrust in the range of 20 kgf to 400 kgf.

Further, as Example 3 of the invention, the side weir 15 was lifted vertically upward by the side weir lifters 340 shown in FIGS. 7 and 8. In this case, spring members were disposed so that a pulling force generated by one side weir lifter 340 was 200 kgf.

As Comparative Example 2, the side weir 15 was not lifted by the side weir lifter 40.

Then, the results of the evaluation of a casting state and the wear state of the side weir after casting are shown in Table 2.

TABLE 2

|  | Casting state | Depth of groove (mm) |
| --- | --- | --- |
| Example 2 of invention | Completion of casting | 0.7 to 1.1 mm on the entire surface |
| Example 3 of invention | Completion of casting | 0.8 to 1.2 mm on the entire surface |
| Comparative Example 2 | Stop casting due to leakage of molten metal | Upper region 0.3 mm Lower region no groove |

In Comparative Example 2, casting was stopped since molten steel leaked from the lower portion of the side weir after the start of casting and the amount of leaking molten steel was gradually increased. After casting, a groove appeared on the surface of the side weir in an upper region above a position corresponding to 25 mm above the roll nip point, but did not appear on the surface of the side weir in a lower region below the position. The depth of the groove was up to 0.3 mm, and a gap of at least 0.3 mm or more was present between the surface of the side weir and the end surface of the roll.

In contrast, in Example 2 of the invention, casting could be continued since a lifting force was stable in the range of 20 kgf to 400 kgf. After casting, a groove carved in the shape of the end surfaces of the rolls appeared on the surface of the side weir. The depth of the groove was in the range of 0.7 to 1.1 mm on the entire surface. It is estimated that the reason for this is that the same portion of the side weir was in sliding contact with the end surfaces of the mold rolls 11 since the shift of the position of the side weir 15 was suppressed.

Further, casting could be stably continued even in Example 3 of the invention. After casting, a groove carved in the shape of the end surfaces of the rolls appeared on the surface of the side weir. The depth of the groove was in the range of 0.8 to 1.2 mm.

According to Examples of the invention, since the shift of the position of the side weir is suppressed as described above, the formation of a large gap between the end surface of the mold roll 11 and the abutting surface of the side weir can be suppressed. As a result, it was confirmed that casting could be stably performed.

INDUSTRIAL APPLICABILITY

According to the invention, it is possible to provide a side sealing device for a twin-roll continuous casting apparatus, the twin-roll continuous casting apparatus, and a method of manufacturing a cast strip that can suppress an increase in a gap between the abutting surface of a side weir and the end surface of a mold roll by suppressing the shift of the position of the side weir and can stably cast a cast strip.

BRIEF DESCRIPTION OF THE REFERENCE SYMBOLS

1: Cast strip
3: Molten steel
5: Solidified shell
11: Mold roll
15: Side weir
16: Molten steel pool portion (molten metal pool portion)
30, 130, 230, 330: Side sealing device
35: Side weir pressing unit
40, 140, 240, 340: Side weir lifter

The invention claimed is:

1. A side sealing device for a twin-roll continuous casting apparatus that supplies molten metal to a molten metal pool portion formed by a pair of rotating mold rolls and a pair of side weirs through an immersion nozzle and causes solidified shells to be formed and to grow on peripheral surfaces of the mold rolls to manufacture a cast strip, the side sealing device sealing end surface sides of the mold rolls by each side weir, the side sealing device comprising:
  a side weir pressing unit, including a hydraulic cylinder, that presses the side weir against end surfaces of the mold rolls; and
  a side weir lifter that pulls the side weir at least upward in a vertical direction and suppresses a downward displacement of the side weir caused by a rotation of the mold rolls in a case where the mold rolls is rotating,
  wherein the side weir lifter is configured to pull the side weir at least upward in the vertical direction by a biasing force of a biasing member, including a spring.

2. The side sealing device according to claim 1,
  wherein the side weir lifter is connected to a region above a centroid of the side weir.

3. The side sealing device according to claim 2,
  wherein the side weir lifter is configured to be engaged with the side weir or a support member, including a back plate, supporting the side weir in a case where the side weir is pressed against the end surfaces of the mold rolls by the side weir pressing unit, and is configured to pull the side weir at least upward in the vertical direction.

4. The side sealing device according to claim 1,
  wherein the side weir lifter is configured to be engaged with the side weir or a support member, including a back plate, supporting the side weir in a case where the side weir is pressed against the end surfaces of the mold rolls by the side weir pressing unit, and is configured to pull the side weir at least upward in the vertical direction.

5. A twin-roll continuous casting apparatus that supplies molten metal to a molten metal pool portion formed by a pair of rotating mold rolls and a pair of side weirs and causes solidified shells to be formed and to grow on peripheral surfaces of the mold rolls to manufacture a cast strip, the twin-roll continuous casting apparatus comprising:
  the side sealing device according to any one of claims 1 to 3.

6. A method of manufacturing a cast strip that supplies molten metal to a molten metal pool portion formed by a pair of rotating mold rolls and a pair of side weirs and causes solidified shells to be formed and to grow on peripheral surfaces of the mold rolls to manufacture the cast strip, the method comprising:
  pressing the side weir against end surfaces of the mold rolls using the side sealing device according to any one of claims 1 to 3; and
  pulling the side weir at least upward in a vertical direction.

* * * * *